United States Patent [19]

Sliemers et al.

[11] Patent Number: 5,356,745

[45] Date of Patent: Oct. 18, 1994

[54] INCREASING ADHESION OF POLYESTER AND PLASTICIZED POLYVINYL BUTYRAL LAYERS

[75] Inventors: Francis A. Sliemers; George P. Nance, both of Columbus, Ohio

[73] Assignee: Monsanto Company, St. Louis, Mo.

[21] Appl. No.: 436,840

[22] Filed: Nov. 15, 1989

[51] Int. Cl.$^5$ .................. G03G 15/04; B32B 17/10
[52] U.S. Cl. ................... 430/66; 427/489; 156/329; 156/272.2
[58] Field of Search .............. 427/40, 489; 156/329, 156/272.2; 430/66

[56] References Cited

U.S. PATENT DOCUMENTS

| | | | |
|---|---|---|---|
| 3,959,567 | 5/1976 | Bradley | 156/272.2 |
| 4,072,769 | 2/1978 | Lidd | 427/40 |
| 4,396,641 | 8/1983 | Imada et al. | 427/40 |
| 4,469,743 | 9/1984 | Hiss | 156/329 |
| 4,818,650 | 4/1989 | Limburg et al. | 430/66 X |

FOREIGN PATENT DOCUMENTS 228545 11/1985 Japan .
174440 7/1989 Japan .

OTHER PUBLICATIONS

English translation of Japanese No. 174440, Jul. 1989 Kokai (1), 14 pages.
English translation of Japenese No. 228545, Nov. 1985, Kokai (2), 27 pages.

*Primary Examiner*—Peter A. Nelson
*Attorney, Agent, or Firm*—Michael J. Murphy; Mark F. Wachter

[57] ABSTRACT

The adhesion between layers of polyester and plasticized polyvinyl butyral is improved by the presence of a surface film of plasma-polymerized chlorosilane (e.g. dichlorosilane) at the interface between the layers.

12 Claims, No Drawings

INCREASING ADHESION OF POLYESTER AND PLASTICIZED POLYVINYL BUTYRAL LAYERS

BACKGROUND OF THE INVENTION

This invention relates to a laminate of polyester and plasticized polyvinyl butyral and more particularly to i) such a laminate displaying improved adhesion between the layers, ii) the method of improving such adhesion and iii) the method of forming the laminate.

Plasticized polyvinyl butyral (PVB) is well known as a shock-absorbing interlayer in safety glazings for vehicle, aircraft and architectural window and security (e.g. jewelry casings) applications. Particularly with vehicle windows, additional functional layers are being proposed in such safety glazings to provide features such as solar energy control, weight reduction by eliminating one glass layer (called a bilayer structure), head-up displays in automobiles and liquid crystal and electrochromic devices for privacy applications. The delicate functional layer(s) providing these enhanced features must be deposited on a suitable substrate which cannot be the PVB layer because of its unusually soft, pliant, plasticized nature. However, to provide penetration-resistance in the safety glazing the PVB layer must be included which means that the substrate for the additional functional layer must be joined to the PVB layer before or during lamination with glass. Polyester film such as polyethylene terephthalate stretched in one or two directions has been used as such a substrate since it is widely commercially available, relatively inexpensive and has good clarity and mechanical strength. However, without initial surface modification it does not adhere sufficiently tenaciously to plasticized PVB to preserve the integrity of the safety glazing laminate of which both layers are a part over the intended useful life of the glazing.

SUMMARY OF THE INVENTION

Now improvements have been made that mitigate shortcomings of the prior art regarding adherence of polyester to plasticized PVB.

Accordingly, a principal object of this invention is to provide a method of improving the adhesion of layers of polyester and plasticized PVB.

Another object is to provide a laminate possessing such improved adhesion and a method for its formation.

Other objects of this invention will in part be obvious and will in part appear hereafter from the following description and claims.

These and other objects are accomplished by providing a laminate comprising a polyester layer having a surface film of plasma-polymerized chlorosilane, preferably dichlorosilane, in face-adhering contact with a layer of plasticized polyvinyl butyral.

Also provided is a method of increasing the adhesion of layers of plasticized polyvinyl butyral and polyester which comprises depositing a film of plasma-polymerized chlorosilane, preferably dichlorosilane, on a surface of the polyester and then laminating the plasticized polyvinyl butyral layer to the polyester layer with such film at the interface between the layers.

Further provided is a method of forming a laminate of plasticized polyvinyl butyral and polyethylene terephthalate which comprises pressing together, at elevated temperature and pressure, a layer of plasticized polyvinyl butyral and a layer of polyethylene terephthalate having a surface film of plasma-polymerized chlorosilane, preferably dichlorosilane, at the interface between the layers.

DETAILED DESCRIPTION OF THE INVENTION

The plasticized polyvinyl butyral layer of the laminate of the invention is well known and commercially available from Monsanto Company as Saflex ® sheet and from E. I. dupont de Nemours and Co. as Butacite ® polyvinyl butyral resin sheeting.

The polyester layer of the inventive laminate should be optically clear and dimensionally stable in view of its anticipated use in window applications. These qualities are present in "graphic" grades of such material which are commercially available from Hoechst Celanese as its Hostaphan 4400 series and from Imperial Chemical Industries (ICI) as Melinex 393 or 504. More particularly, such polyester comprises polyethylene terephthalate (preferably 100% by weight) and is preferably molecularly (preferably biaxally) oriented.

In forming the laminate, as further described hereafter, the layers are pressed together (after initial plasma treatment of the PET layer) in face-adhering contact at a pressure of at least 160 psi while the layers are at a temperature of about 260° F. to 300° F.

The gaseous composition constituting the plasma atmosphere is chlorosilane. Operable chlorosilanes include trichlorosilane, chloro derivatives such as chloromethyl silanes, chlorovinyl silanes and the like. Dichlorosilane is preferred.

By the present invention, cold plasma (RF, audio, DC, microwave and the like) is used to polymerized chlorosilane from the vapor phase onto a PET film surface to form a very thin, continuous, highly adherent coating thereon which, when laminated to plasticized PVB with such coating at the interface greatly enhances adhesion between the two layers. This enables the resulting plastic laminate to be used with other layered components in architectural, automotive and security window applications. Representative of such additional layered components is a solar energy control coating deposited on the opposite side of the polyester layer from that which had been plasma-treated according to the invention. Such a solar coating typically comprises a stack of plural alternate metal and dielectric layers which cooperate in well known fashion to control passage through the laminate of the near IR portion of the solar spectrum to which the laminate in a window application might be exposed.

Peel strengths of the PET/PVB laminates were determined in accordance with ASTM D1876-72 (reapproved 1978); specimen size was 1×6 in. The load was applied at a constant head speed of 10 in/min which provided a separation rate of 5 in/min. An Instron Universal Testing Machine was employed. Three specimens were tested for each treatment and the results presented hereafter are the average values for such three specimens.

The following example is presented to show how the invention is practiced, but should not be construed as limiting.

EXAMPLE

Biaxally oriented PET film (4 mils thick) obtained as Hostaphan 4400 from Hoechst Celanese was surface-coated with an ultrathin film of polymerized dichlorosilane monomer in the reaction chamber of a plasma polymerization system.

Procedurally, the PET film was mounted on a cylindrical aluminum holder about 4 in. in diameter and 6 in. in height which was then placed on a 5 in. diameter copper cathode in the reaction chamber. The PET film was initially dusted in an ionized stream of dry nitrogen gas before placement in the chamber. The chamber was evacuated to about 1 micron total pressure and then dichlorosilane monomer was admitted while the pressure was adjusted to the desired level with a fine needle metering valve. The rate of monomer flow was determined by the rise in pressure when the vacuum was closed off. The audio frequency (125 KHz) power was applied to the cathode and continued for the desired period. At the end of the plasma treatment the power was shut off, the monomer inlet valve closed and the reaction chamber evacuated to 5–10 microns to remove unreacted monomer and plasma reaction products. The reaction chamber was then returned to atmospheric pressure by slowly bleeding air into the system.

Saflex sheet was conditioned at 33% relative humidity prior to lamination. A laminate was formed of the plasticized polyvinyl butyral (30-mil thick Saflex) sheet and the plasma-treated polyethylene terephthalate film (without further treatment or alteration of the plasma-treated PET) by pressing the two layers together for 60 sec. at 185 psi, 285° F. with the surface film of plasma-polymerized dichlorosilane at the interface between the layers. The peel strength was determined and results were as follows:

| Substrate | Treatment | Chamber Pressure (microns) | Power (watts) | Deposition Time (min) | Peel Strength (lb/in) |
|---|---|---|---|---|---|
| 4 mil PET | None | — | | | 0.16 |
| 4 mil PET | Dichlorosilane | 60 | 100 | 1.0 | 10.1 |
| 4 mil PET | Dichlorosilane | 60 | 100 | 5.0 | 10.3 |

The effect on peel strength of laminates with Saflex of aging the plasma-coated polyethylene terephthalate was investigated by holding the PET samples after plasma treatment as noted above at 72° F. and 40% RH for 22 days before lamination to the Saflex using the above lamination conditions. A peel strength value of 8.1 lb/in was obtained with the resulting laminate using the one-minute-treated PET sample. This shows no significant deterioration in peel strength using plasma-treated PET which has been aged before lamination to the PVB layer.

The preceding description is set forth for purposes of illustration only and is not to be taken in a limited sense. Various modifications and alterations will be readily suggested to persons skilled in the art. It is intended therefore that the foregoing be considered as exemplary only and that the scope of the invention be ascertained from the scope of the following claims.

We claim:

1. A laminate comprising a polyester layer having a surface film of plasma-polymerized chlorosilane in face-adhering contact with a layer of plasticized polyvinyl butyral.

2. The laminate of claim 1 wherein the polyester is polyethylene terephthalate.

3. The laminate of claim 2 wherein the polyethylene terephthalate is molecularly oriented.

4. The laminate of claim 3 wherein the molecular orientation is biaxial.

5. The laminate of claim 1,2,3 or 4 having a peel strength of at least 7.5 lb/in.

6. The laminate of claim 5 wherein the chlorosilane is dichlorosilane.

7. A method of increasing the adhesion of layers of plasticized polyvinyl butyral and polyester which comprises:

a) depositing a film of plasma-polymerized chlorosilane on a surface of the polyester; and b) laminating the plasticized polyvinyl butyral layer to the polyester layer with said film at the interface between the layers.

8. A method of forming a laminate of plasticized polyvinyl butyral and polyethylene terephthalate which comprises pressing together, at elevated temperature and pressure, a layer of plasticized polyvinyl butyral and a layer of polyethylene terephthalate having a surface film of plasma-polymerized chlorosilane at the interface between the layers.

9. The method of claim 8 wherein pressing occurs at a pressure of at least 160 lb/in$^2$ while the layers are at a temperature of about 260 to 300° F.

10. The method of claim 9 wherein the laminate after pressing has a peel strength of at least 7.5 lb/in.

11. The method of claim 8,9 or 10 wherein the polyethylene terephthalate film containing said surface coating is aged for at least about twenty days at 72° F. and 40% relative humidity before said pressing occurs.

12. The method of claim 11 wherein the chlorosilane is dichlorosilane.

* * * * *